United States Patent [19]

Sarayeddine

[11] Patent Number: 5,877,824
[45] Date of Patent: Mar. 2, 1999

[54] SYSTEM FOR ILLUMINATING A LIQUID-CRYSTAL SCREEN

[75] Inventor: Khaled Sarayeddine, Nouvoitou, France

[73] Assignee: Thomson multimedia, S.A, Boulogne Cedex, France

[21] Appl. No.: 633,242

[22] Filed: Apr. 16, 1996

[30] Foreign Application Priority Data

Apr. 28, 1995 [FR] France ................................. 95 05113

[51] Int. Cl.⁶ .......................... G02F 1/1335; G02B 5/32
[52] U.S. Cl. .................................... 349/8; 349/7; 349/95; 359/15; 359/583
[58] Field of Search ................................ 349/95, 5, 8, 7; 359/629, 634, 636, 583, 15, 495, 498

[56] References Cited

U.S. PATENT DOCUMENTS

| | | | |
|---|---|---|---|
| 4,769,750 | 9/1988 | Matsumoto et al. | 362/268 |
| 5,506,701 | 4/1996 | Ichikawa | 359/15 |
| 5,548,349 | 8/1996 | Mizuguchi et al. | 359/456 |
| 5,737,113 | 4/1998 | Kuramochi et al. | 359/259 |

FOREIGN PATENT DOCUMENTS

| | | |
|---|---|---|
| 0395156 | 10/1990 | European Pat. Off. . |
| 0512893 | 11/1992 | European Pat. Off. . |
| 0563874 | 6/1993 | European Pat. Off. . |
| 95/00865 | 1/1995 | WIPO . |

OTHER PUBLICATIONS

Optical Engineering, vol. 32, No. 11, Nov. 1993, Bellingham US pp. 2665–2670 E.A. Watson "Analysis Of Beam Steering With Decentered Microlens Arrays".
Copy of European Search Report.

Primary Examiner—Hung X. Dang
Assistant Examiner—Tiep H. Nguyen
Attorney, Agent, or Firm—Joseph S. Tripoli; Dennis H. Irlbeck

[57] ABSTRACT

This system for illuminating a liquid-crystal screen comprises a light source which emits an unpolarized light beam (F). A polarizing splitter device (PBS) receives this unpolarized light beam and retransmits, onto the liquid-crystal screen, a first and a second beam (F1, F2) which are polarized in the same polarization direction. The axes of the two beams make a defined angle ($2\beta$) between them. A matrix of microlenses is provided with one microlens ($\mu L$) for at least two adjacent picture elements (EL1, EL2) in the liquid-crystal screen. Each microlens directs that part of the first beam which it receives onto one (EL1) of the two picture elements and that part of the second beam which it receives onto the other picture element (EL2).

19 Claims, 14 Drawing Sheets

SYSTEM FOR ILLUMINATING A LIQUID-CRYSTAL SCREEN

The invention relates to a system for illuminating a liquid-crystal screen and especially a system enabling the two polarizations of an unpolarized illumination source to be used effectively.

BACKGROUND OF THE INVENTION

The emergence of liquid-crystal screen technology offers an excellent outlet for video projection techniques. The light emitted by an arc lamp is modulated by a liquid-crystal cell. The image formed by the liquid-crystal display device is projected by an optical system onto a screen. The so-called AM-TFT TNLCD technique (that is to say twisted-nematic liquid-crystal display controlled by an active matrix of thin-film transistors) is regarded as essential for liquid-crystal screens, each picture element (pixel) being controlled by a transistor. The light incident on the liquid-crystal screen must be linearly polarized. The major drawback of this technique is its low efficiency.

In fact, 1 to 2% of the light reaches the screen. Three main parameters limit this efficiency, namely:

1—more than 50% of the light is lost (−60%) since the light coming from the lamp is not polarized;

2—the filling factor of the cell is limited, especially for the definition of a large image and the small diameter of the liquid-crystal modulator. The filling factor or OAR (Open Aperture Ratio) is about 50%;

3—since the lamp is not small, the illumination of the small diameter of the LCD liquid-crystal display (the light beam being defined by the solid angle adapted to the contrast of the LCD display) decreases the light efficiency. Screens of 16:9 format have a light efficiency of less than 40%.

Other factors cause attenuation, such as colour rendition, white balancing and Fresnel losses.

Many solutions have been proposed to improve the light efficiency of these projection systems. Some solutions propose the conversion of the second polarization (see, for example, the document "Large Aperture Polarized Light Source and Novel Liquid Crystal Display Operating Modes" S. V. Belayev, M. Schadt, M. I. Barnik, J. Funufschilling, N. V. Malimoneko and K. Schmitt. Japanese Journal of Applied Physics, Vol. 29., April 1990, pp. L634–L637) in the illumination box, and others recommend the use of microlenses intended to concentrate the light in the active area of the pixels in the screen (see for example the document "Brightness Enhancement of an LCD Projection by Planar Microlens Array", H. Hamada, F. Funada, M. Hijikigawa and K. Awane, SID 92 DIGEST, pp. 269–272).

The invention relates to a high-performance polarizing converter which can be combined with conventional microlenses so as to obtain a high-efficiency projector, characterized by a performance which is superior, possibly by up to a factor of 3, compared to a conventional system.

In order to illustrate the various improvements made to the proposed systems, we have worked on the basis of the useful geometrical extent or analysis of the extent.

The value of the extent of a light beam through a surface S is the product of the area of the said surface multiplied by the solid angle defining the light beam:

$E(mm^2.sr) = S(\text{circular area}) \times \Omega$ where:

$\Omega = 2\pi[1 - \cos(\beta)]$, $\beta$ being the illumination half-aperture.

The lamp used in the liquid-crystal projection display system has a spatial extension (that is to say a non-zero spatial extension); it may be characterized by its extent: $E_{lamp}$ or Flux (Flux=E (Extent)×(L (Luminance), if L is constant).

Moreover, the contrast of the LCD liquid-crystal display is largely dependent on the illumination aperture. If $\beta < \pm 10$ deg., the contrast will be always acceptable for projection. Thus, $\Omega$ is limited to a value $\Omega 1$. The said limitation is also associated with the objective lens used for the projection.

Furthermore, liquid-crystal screens having quite a small diameter have been chosen so as to decrease the cost of the said systems and their optical components, resulting in a small illumination area S1.

If the product of $S1 \times \Omega 1$, that is to say E1, is less than $E_{lamp}$, the light efficiency will be poor and equal to the ratio $E1/E_{lamp}$.

If E1 is greater than $E_{lamp}$, that is to say the light efficiency will be equal to 100%.

If E1 is equal to $E_{lamp}$, the system will be satisfactorily optimized.

The polarizing conversion system doubles the value of the extent E since the light from the two polarization components is spatially split into two directions.

After having passed through the polarization splitter, the light E becomes 2E. At this stage, 2 cases may be considered:

2E=(2S)×Ω, which is not acceptable because of homogeneity and space problems;

2E=S×(2Ω)—the current techniques demonstrate that many systems do not achieve this minimum value (i.e. 2Ω), but higher than this.

Analysis of the extent may be applied to the method of focusing the light onto the pixels in the liquid-crystal screen. For conventional focusing using a matrix of spherical microlenses—one microlens for each pixel for 100% focusing—hence the need to obtain a filling factor of 100% and no longer 50% (or less); the reason for this is that the focusing area is less than or equal to the active area of the pixel, that is to say:

$2f \times \tan(\beta_{glass}) \leq \text{active area}$ where:

the active surface area of the pixel is equal to the pixel area less the area of the black matrix (masking matrix), i.e. size of the pixel—black matrix;

f is the thickness of the liquid-crystal screen; and $\beta_{glass}$ is the illumination half-angle within the glass of the LCD display.

Knowing the parameters of the system—f, $\beta_{glass}$, size and dimensions of the LCD display—it is thus possible to define the quantity of light passing through the screen after focusing:

$E_{focusing} = S$ (circular area at the periphery of the LCD display)×2π[1−cos (n.$\beta_{glass}$)], where n is the refractive index of the glass of the LCD display.

As mentioned previously, the total efficiency is the ratio of $E_{focusing}$ to $E_{lamp}$.

Conventional illumination systems provided with polarizing or focusing-based conversion devices cannot actually be used because of the extension of the value of extent, characteristic of the polarizing converter for example, thereby cancelling out the advantage of the focusing, even if the lamp has a restricted geometrical extent. The invention solves this problem and gives a gain of greater than 3 in the light flux.

Furthermore, extension of the solid angle $\Omega$ may be performed in various ways—either in the direction of the orifice or in another direction (horizontal or vertical with respect to the distribution of the isocontrast of the LCD display). Extension in the correct direction for the contrast of the screen is possible in this case.

SUMMARY OF THE INVENTION

The invention therefore relates to a system for illuminating a liquid-crystal screen, comprising a light source emitting an unpolarized light beam, a polarizing splitter device receiving this unpolarized light beam and retransmitting, onto the liquid-crystal screen, a first and a second beam which are polarized in the same polarization direction, the axes of the two beams making a defined angle, characterized in that it includes a matrix of microlenses with one microlens for two adjacent picture elements in the liquid-crystal screen, each microlens directing that part of the first beam which it receives onto one of the two picture elements and that part of the second beam which it receives onto the other picture element.

DESCRIPTION OF THE DRAWINGS

The various objects and characteristics of the invention will appear more clearly in the following description and in the appended figures which represent.

DETAILED DESCRIPTION OF THE INVENTION

One embodiment of the system of the invention will therefore be described with reference to FIGS. 1a, 1b, 2a and 2b.

Figures 1A, 1B:
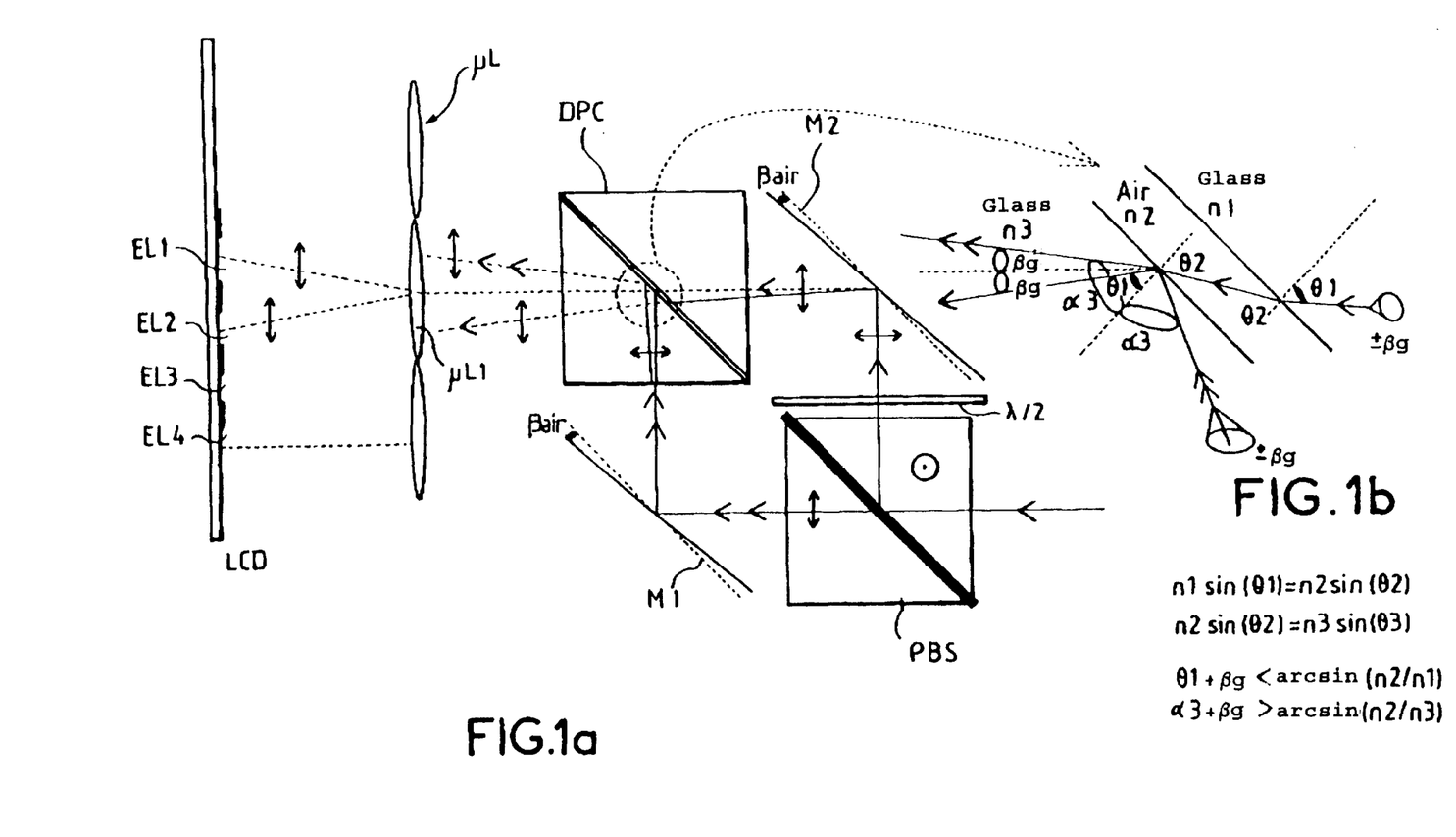
FIGS. 1a and 1b, a simplified embodiment of the system according to the invention.

The light emitted by the arc lamp AL, inside a parabolic reflector for example, is incident on the polarizing splitter PBS (Polarizing Beam Splitter) having cholesteric filters or other polarization-sensitive components. The light is split into two parts (beams F1 and F2) of complementary polarizations. One of the polarizations is rotated through λ/2 by the use of, for example, a TN liquid-crystal cell. Two beams are recombined by the mirrors M1 and M2 or by total-reflection prisms at a double prism DPC. The latter combines the two beams F1 and F2 and provides an extended illumination with twice the light flux (except for Fresnel losses).

The core of this system is the double prism DPC. As shown in FIG. 1b, its operation is as follows: a total internal reflection takes place within the glass, at the glass/air dioptric interface for example, when the angle of incidence of the light becomes greater than the critical angle $\theta_c$ (equal to arcsin (1/n), n being the refractive index of the glass). Each beam, having an angle of incidence greater than $\theta_c$ on this surface, is totally reflected. However, the beams having a low angle of incidence are transmitted (except for Fresnel losses) in the air or from the air to the glass because of the symmetry of propagation. It may therefore be seen that, depending on the directions of the beams F1, F2 supplied by the mirrors M1, M2, the beam F2 is transmitted by the double prism DPC and the beam F1 is reflected.

The light is incident on the liquid-crystal display LCD via a matrix of microlenses $\mu$L. These microlenses may be spherical or cylindrical. One microlens covers at least two pixels. It is therefore designed to direct one beam to one pixel and the second to the other pixel. For example, the beam F1 transmitted by the microlens $\mu$L1 illuminates the pixel EL1 and the beam F2 illuminates the pixel EL2. According to this method, all the light passes through the liquid-crystal display, hence optimum results.

We actually obtain a wave $2\Omega$ for a surface area of substantially 1S, meaning that we reach a minimum value of the extent.

Figures 2A, 2B:
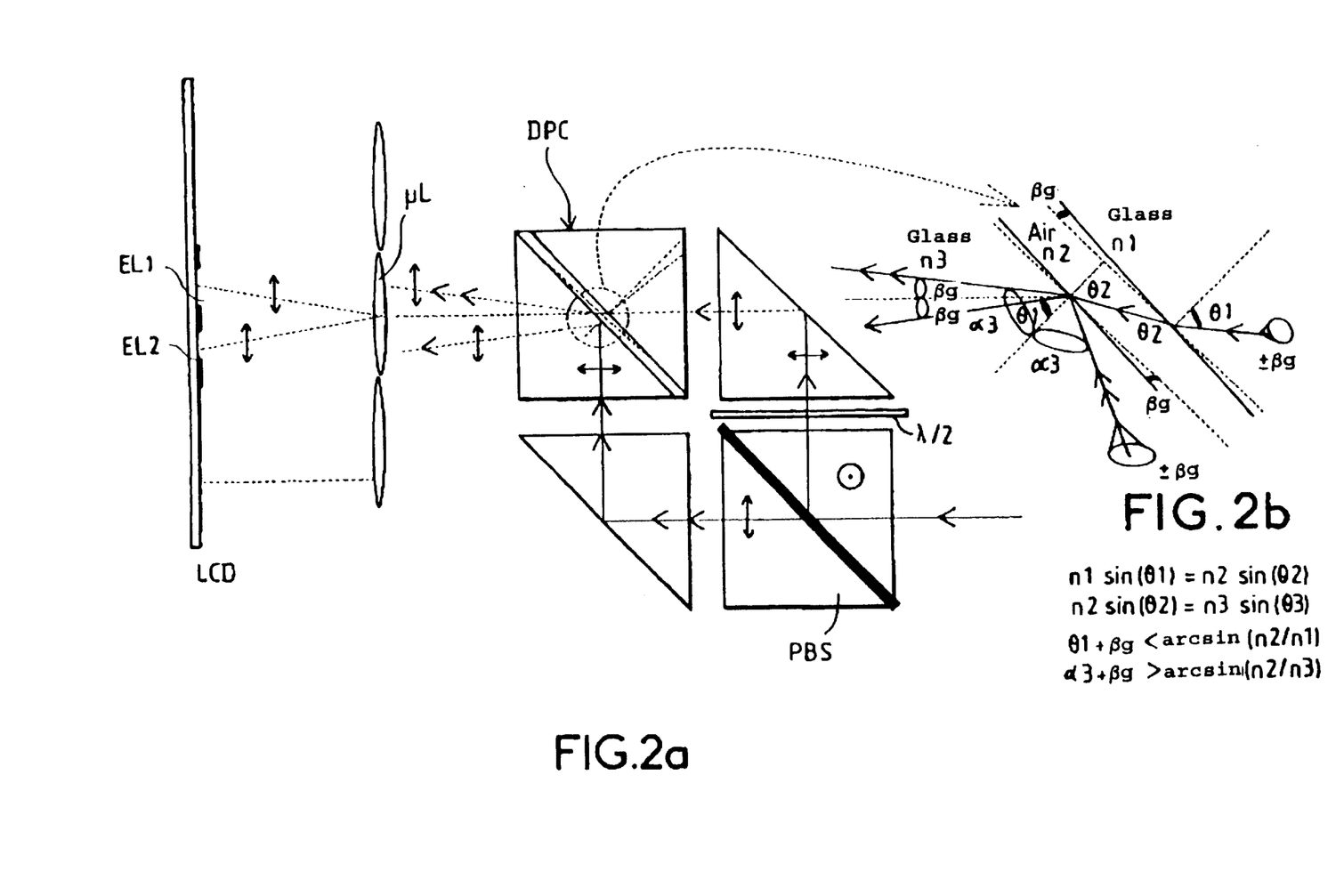
FIGS. 2a and 2b, an alternative form of the system in FIGS. 1a and 1b.

FIGS. 2a, 2b show a system according to the invention in which the rotatable mirrors are replaced by prisms. In this case, the inclination of the two glass/air dioptric interfaces in the plane of recombination causes no problem.

We know that the light beam from the light source is not collimated, but rather has an illumination aperture of $\pm\beta_{air}$. Thus, for combining, the conditions relating to the critical angle $\beta_c$ and to the inclined angle should be satisfied (see FIGS. 1 and 2).

Figures 3A, 3B:
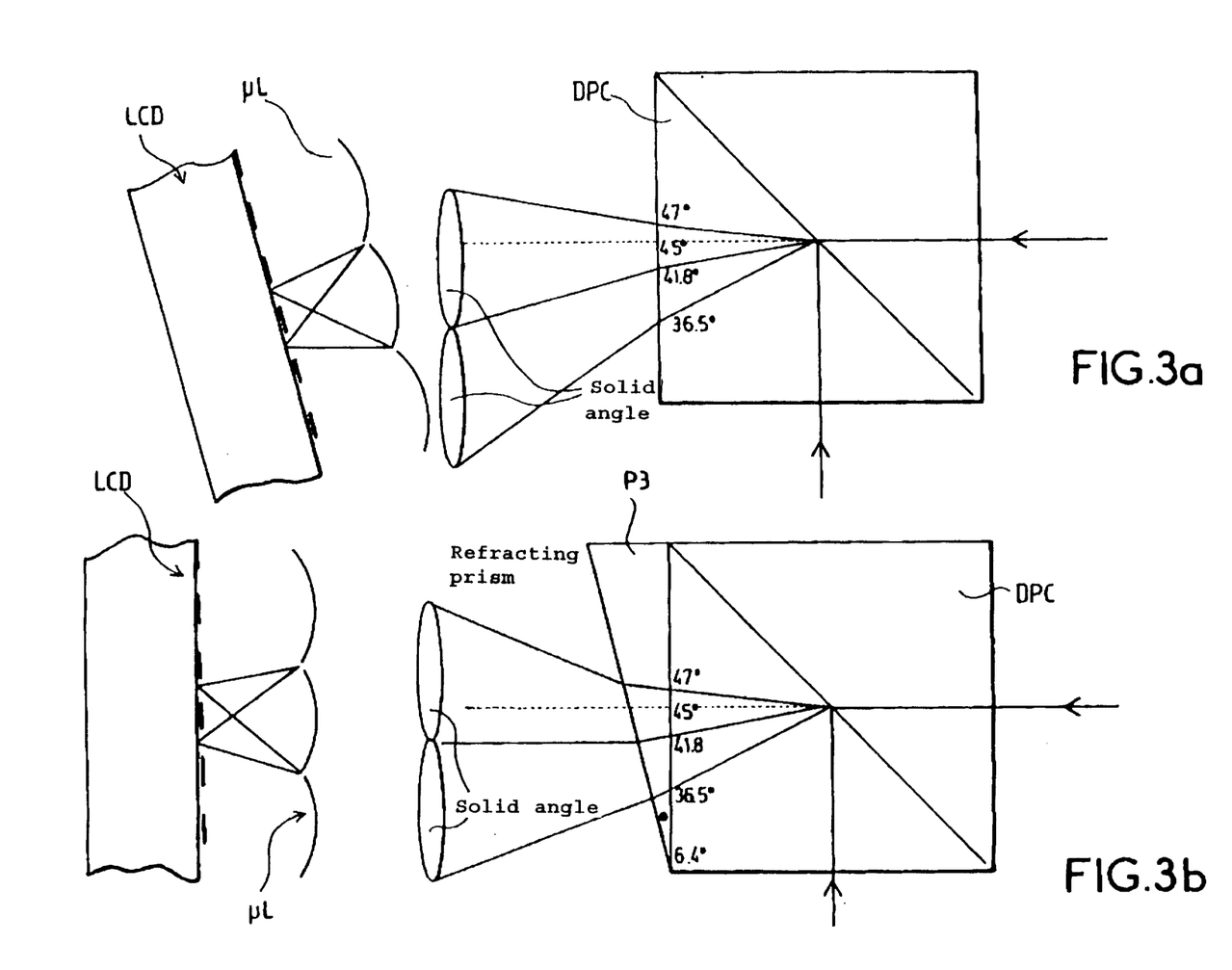
FIGS. 3a and 3b, means for centering the light with respect to the normal to the plane of the screen.

FIGS. 3a and 3b show an example in which the glass (BK7) has an index of 1.5168. The light emitted by the double prism is not centred on the normal to the exit face of the double prism. In this case, it is possible to illuminate the liquid-crystal screen directly (FIG. 3a) by inclining the latter or by providing an exit prism P3 (FIG. 3b) so as to refract the light beam and then to centre the light for illuminating the liquid-crystal screen.

In order to centre the emitted illumination, it is necessary to provide quite a low refractive index (n=1.4) for the double prism. However, this index is not absolutely essential and leads to high costs.

Figure 4:
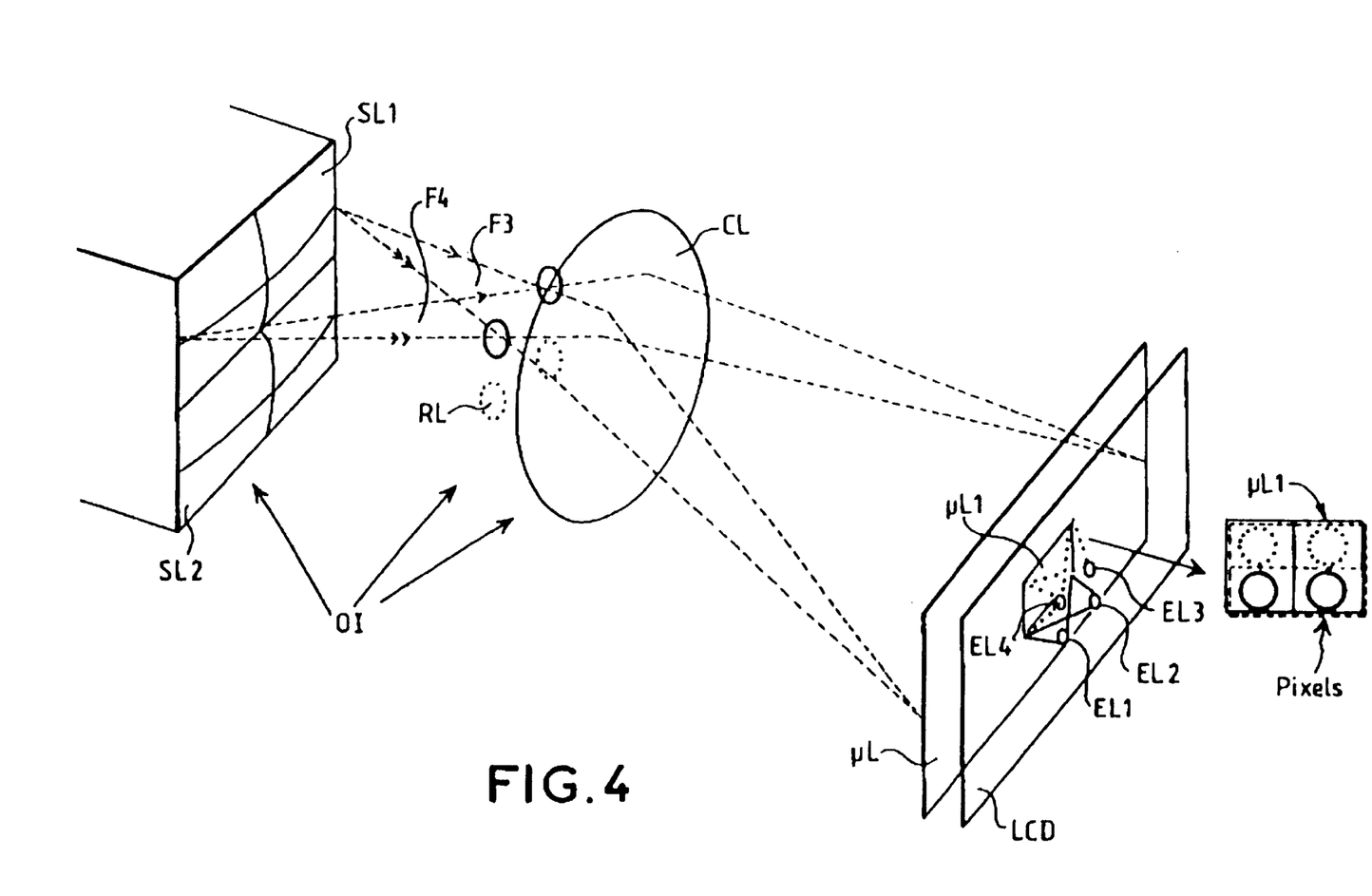
FIG. 4, an embodiment of the system of the invention in which one microlens enables four picture elements in the screen to be illuminated.

Referring to FIG. 4, an embodiment of the invention will now be described in which each microlens enables four pixels to be illuminated.

The system has two lenses SL1, SL2 receiving the two angularly split beams supplied by the beam splitting system described above. For example, these two beams are supplied by the double prism DPC in FIGS. 1a and 2a.

The lens SL1 supplies two beams F3 and F4. The lens SL2 supplies two beams F5 and F6, these not being shown but being similar to the beams F3 and F4. These various beams are integrated by four relay lenses RL and a collecting lens CL so that each beam is superimposed on the surface of the matrix of microlenses $\mu$L. These various beams are incident on the $\mu$L surface at different angles of incidence. Each microlens $\mu$L1 focuses a beam onto a pixel EL1 to EL4. Thus each microlens $\mu$L1 enables four pixels in the LCD screen to be illuminated.

According to the invention, the light source may be extended in the direction of the largest dimension of the liquid-crystal display, for example along the 16 dimension for a 16×9 screen. The microlenses may be cylindrical (focusing along the 16 axis) or spherical. In the latter case, the gain in light flux is greater. The microlenses may be produced according to the prior art.

Figure 9A:
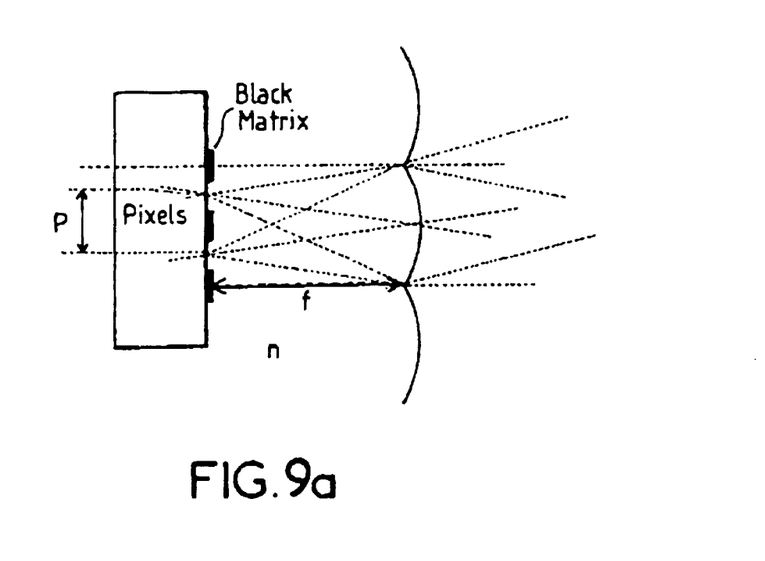
FIGS. 9a to 9c, configurations of picture elements in the screen.
Figure 9B:
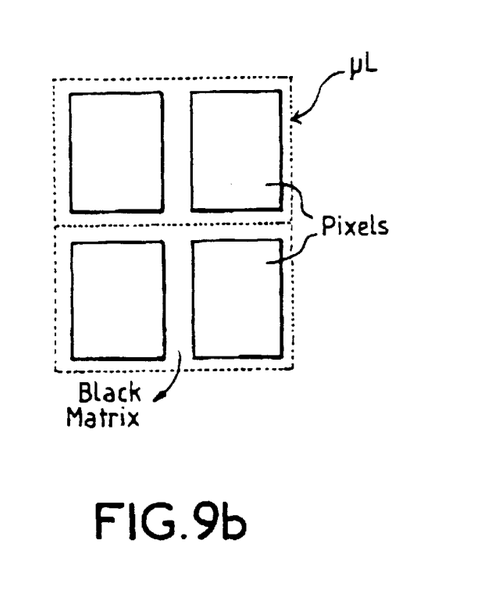
Figure 9C:
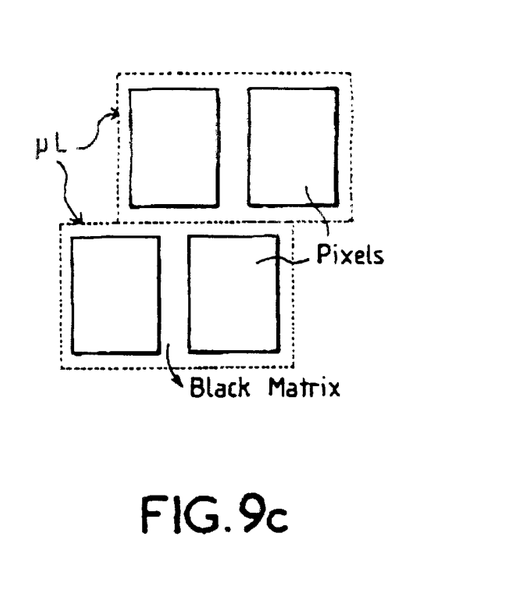

There is no restriction with regard to the configuration of the pixels (FIGS. 9a to 9c). For example, according to FIG. 9b, the pixels may be arranged in rows and columns. Four pixels may be illuminated by a single microlens μL, according to the illumination system of FIG. 4, or else each group of two pixels may be illuminated by one microlens. According to FIG. 9c, the rows of pixels are offset with respect to one another. Each group of two pixels is illuminated by one microlens μL.

Figure 11:
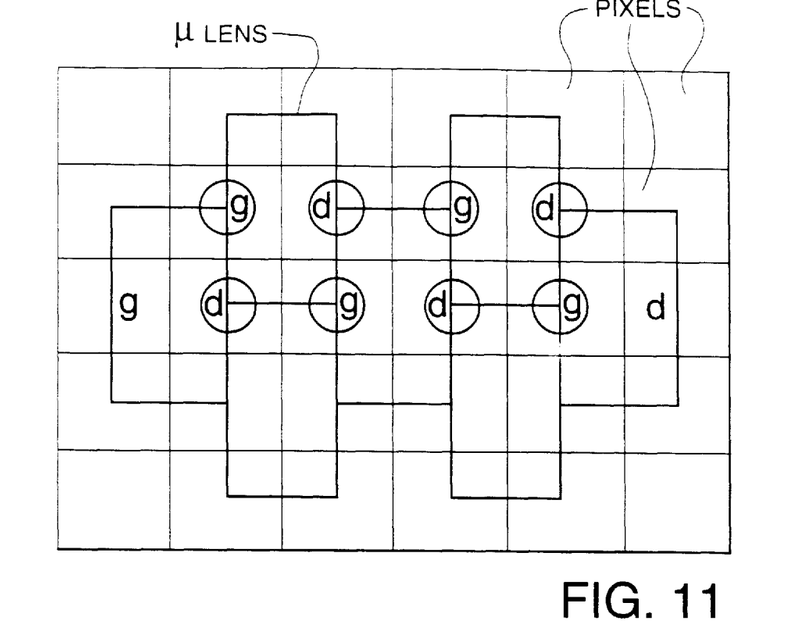
FIGS. 11 and 12, examples of arrangements and of shapes of lenses for illuminating the liquid-crystal screen.
Figure 12:
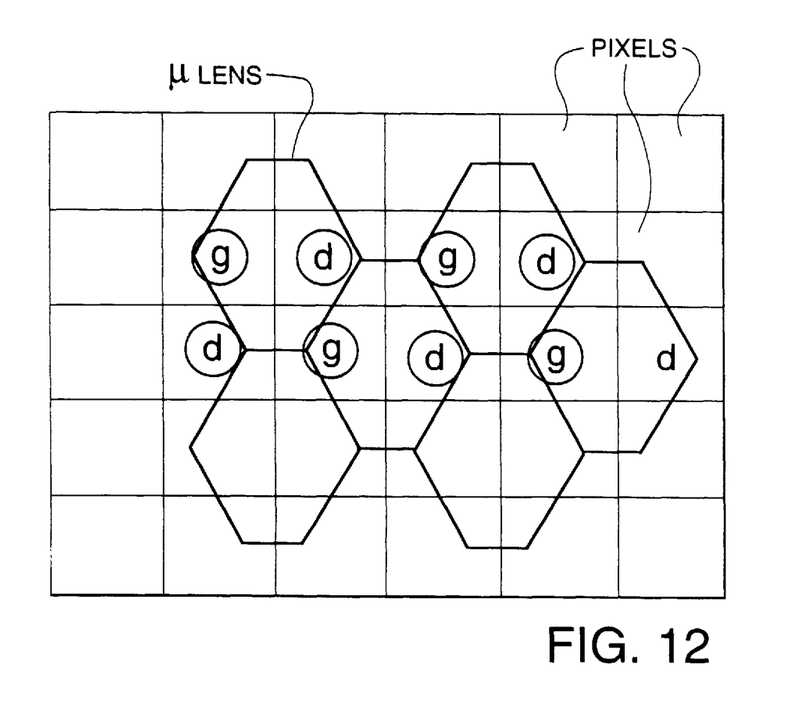

According to the embodiments in FIGS. 11 and 12, it is also possible to design arrangements of microlenses with respect to the pixels so that each microlens illuminates several pixels. It is also possible, as shown in FIG. 12, to design the shape of the microlenses (for example a hexagonal shape) so that it matches the circular shape of the projection objective.

We will now give examples of polarizing splitters or cholesteric filters used as polarization converter.

Figure 5A:
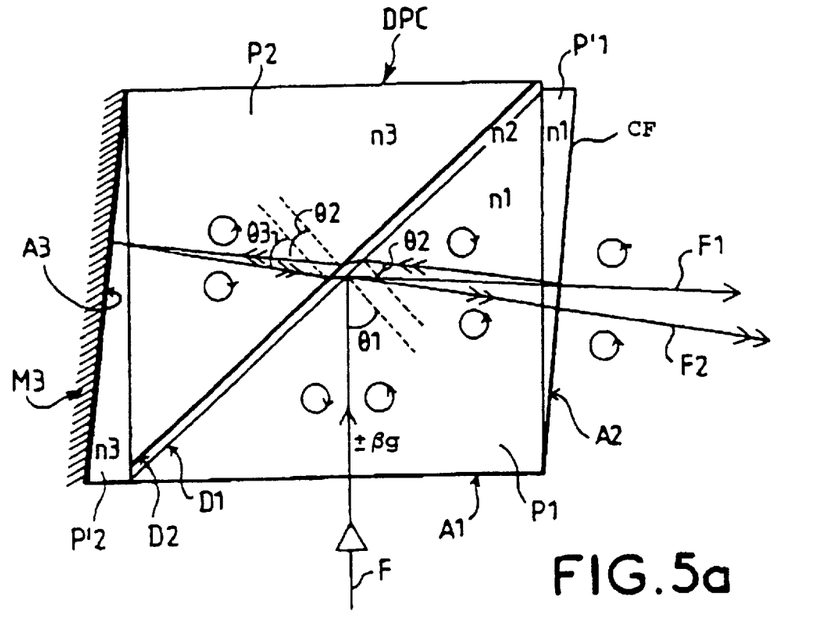
FIGS. 5a to 5e, means for producing the light polarization system using a cholesteric filter.
Figure 5B:
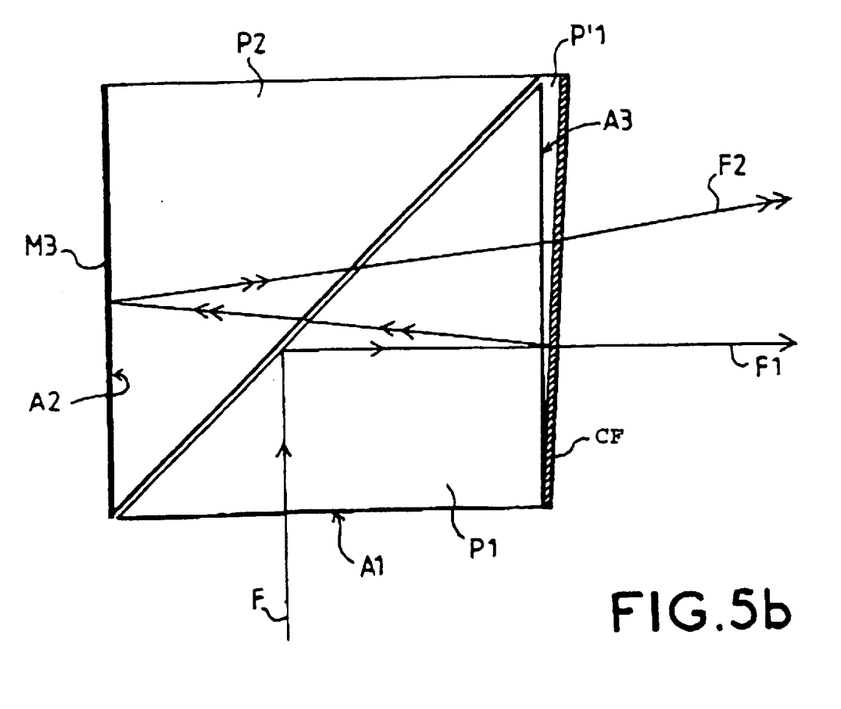

FIGS. 5a and 5b show systems according to the invention in which the double prism DPC fulfills the functions of polarizing splitting, polarization rotation and recombination of the beams in the direction of the liquid-crystal screen.

This system is based on the principle of total internal reflection for the purpose of combining the two beams. The unpolarized beam F is totally reflected by the first glass/air dioptric interface D1. 50% of the intensity of the beam is transmitted for the right-circular polarization (for example) and 50% is reflected by the cholesteric filter CF, and then becomes incident at the glass/air dioptric interface D1 with an angle of incidence of θ2 so that θ2 is less than this critical angle. Next, the beam is transmitted as far as its reflection on the mirror M3 (metallized surface). On reflection, the direction of polarization is reversed, from right to left. This beam then passes through the glass/air dioptric interface D2 under the same conditions as those mentioned previously and passes through the cholesteric filter CF, since the polarization is now suitably oriented. The resultant light beams F1 and F2 make an angle β suitable for illuminating the liquid-crystal screen.

It is also possible to provide only a single additional prism, for example P'1, as shown in FIG. 5b. It is then important for the plane of the cholesteric filter CF not to be parallel to the plane of the mirror M3.

Figure 5C:
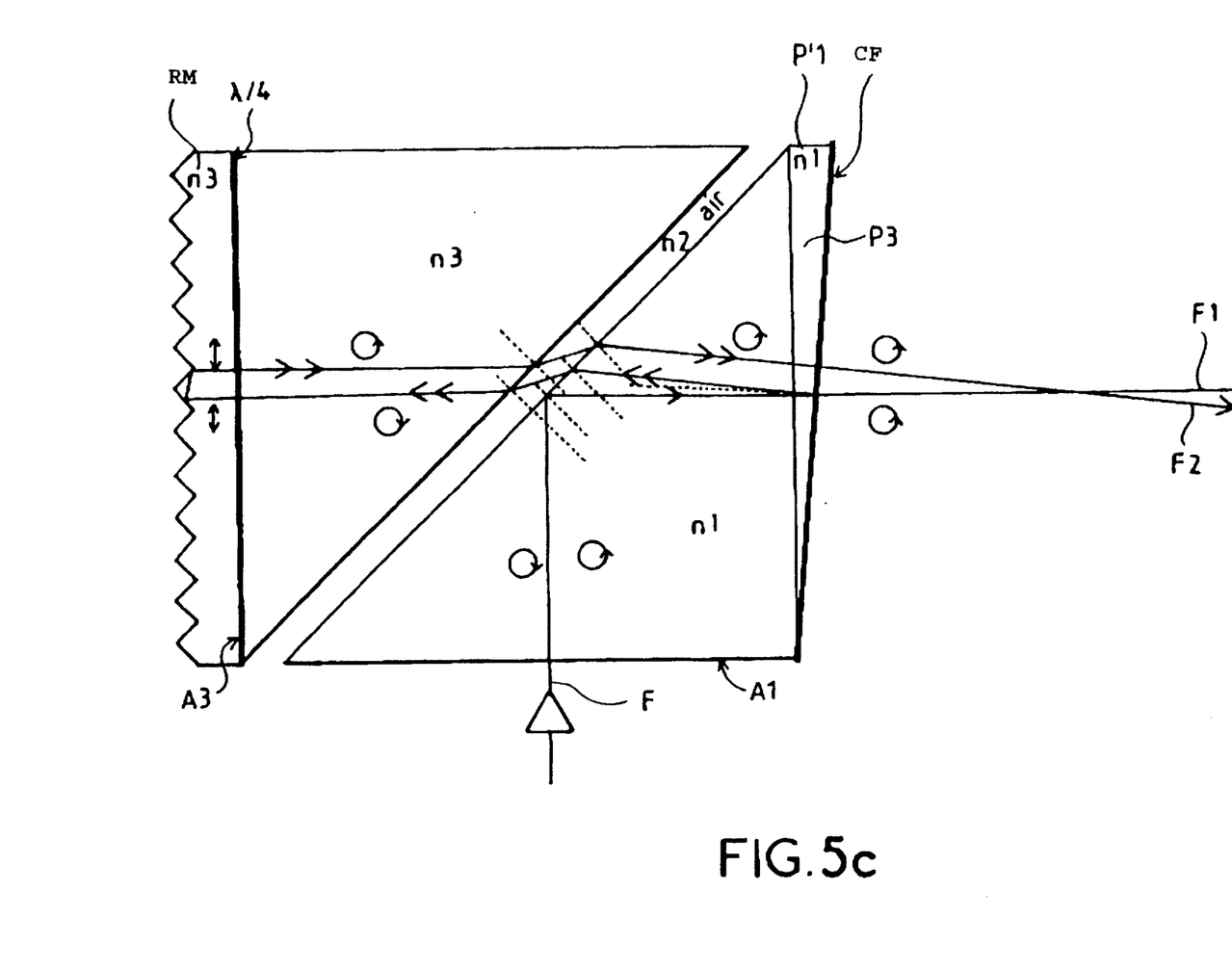

FIG. 5c shows another polarizing conversion system based on cholesteric filters. It is advantageous to replace the mirror M3 by a retroreflector MR and a λ/4 plate in order to orient the plane of polarization of the incident light. The (90 degree) retroreflector is practical since the incident light reflected on the retroreflector is parallel.

Figure 5D:
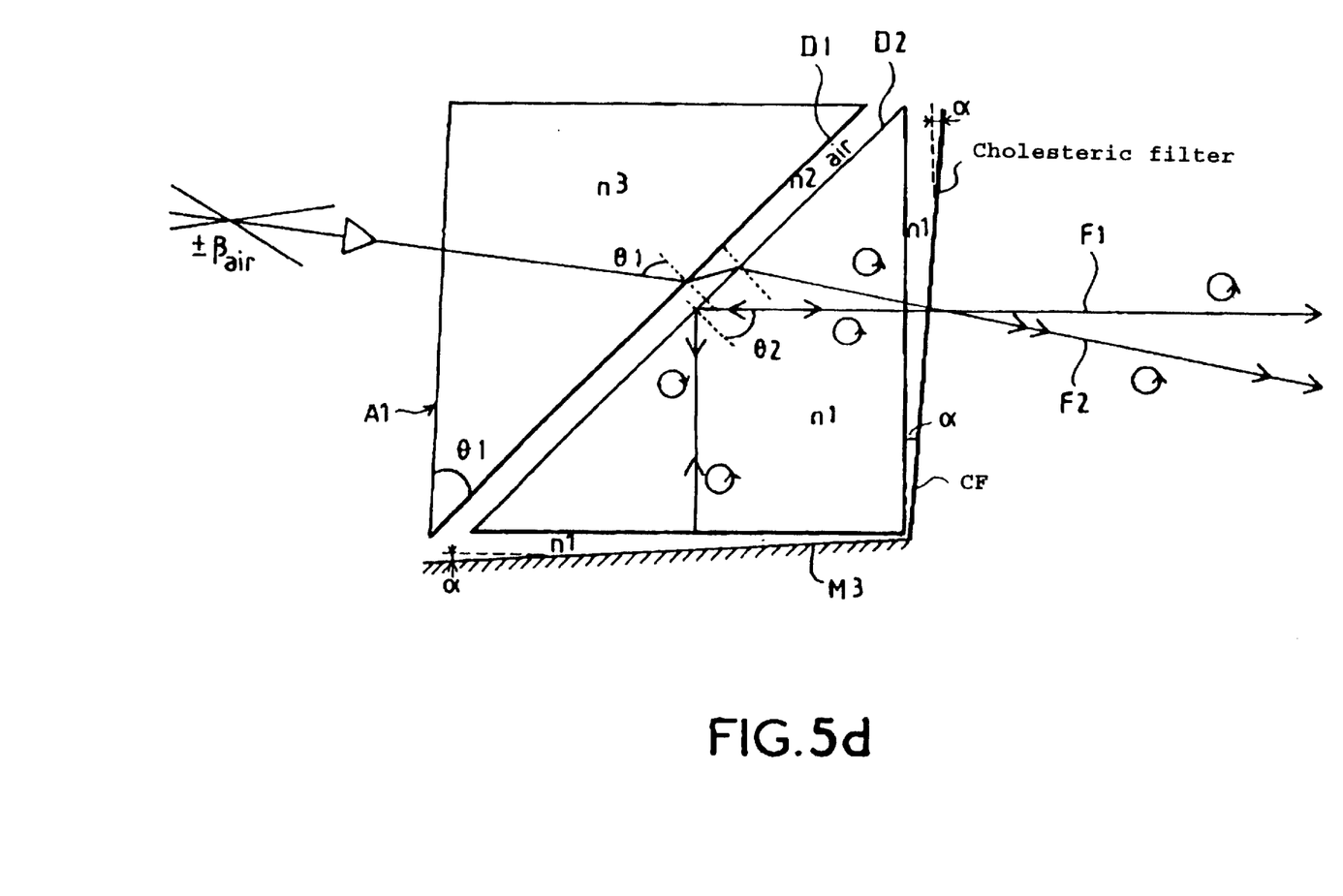

FIG. 5d shows another polarizing conversion system based on the use of cholesteric filters. Compared to the previous figures, the unpolarized light is totally transmitted across two glass/air interfaces D1, D2. Next, the beam is split into two parts—50% of the circularly polarized light is transmitted and the other part is reflected. The angle of incidence on the cholesteric filter CF is such that the reflected light is totally internally reflected at the glass/air interface. This beam is once again reflected on the mirror M3 (at a virtually zero angle of incidence), and has its polarization reversed, and is then reflected by the dioptric interface D2 onto the filter CF. The DPC device thus supplies two beams of the same polarization. The angle between the beams F1 and F2 arises from the fact that the filter CF is not perpendicular to the mirror M3.

In order to obtain an angle between the beams F1, F2, provision is made in FIG. 5d for the cholesteric filter CF to be inclined with respect to the optical axis of the system (with respect to the beam F). Thus, the beam reflected by the filter CF is inclined with respect to the beam F and therefore with respect to F1. This inclination may be provided by means of an auxiliary prism P'1.

Figure 5E:
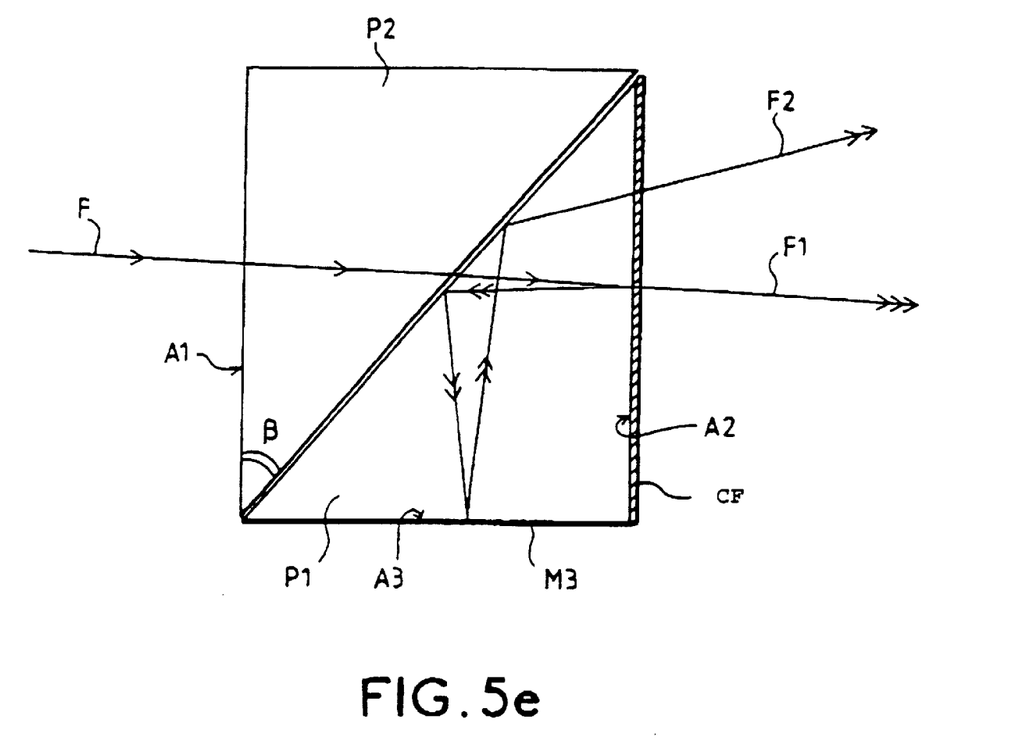

FIG. 5e shows an alternative form of the system of FIG. 5d in which the two prisms P1 and P2 are not 45° isosceles triangles. According to this figure, the entry face A1 of the prism P2 makes an angle β of less than 45° with the hypotenuse of the prisms. One of the polarizations is transmitted as the beam F1 by the filter CF. The other polarization is reflected by the filter CF, the splitting dioptric interface of the two prisms and the mirror M3 in order to give the beam F2. The beam F2 then makes an angle with the beam F1. Because of critical angles of reflection at the interfaces between the prisms, the direction of the beam F may be inclined with respect to the face A1.

Figure 6:
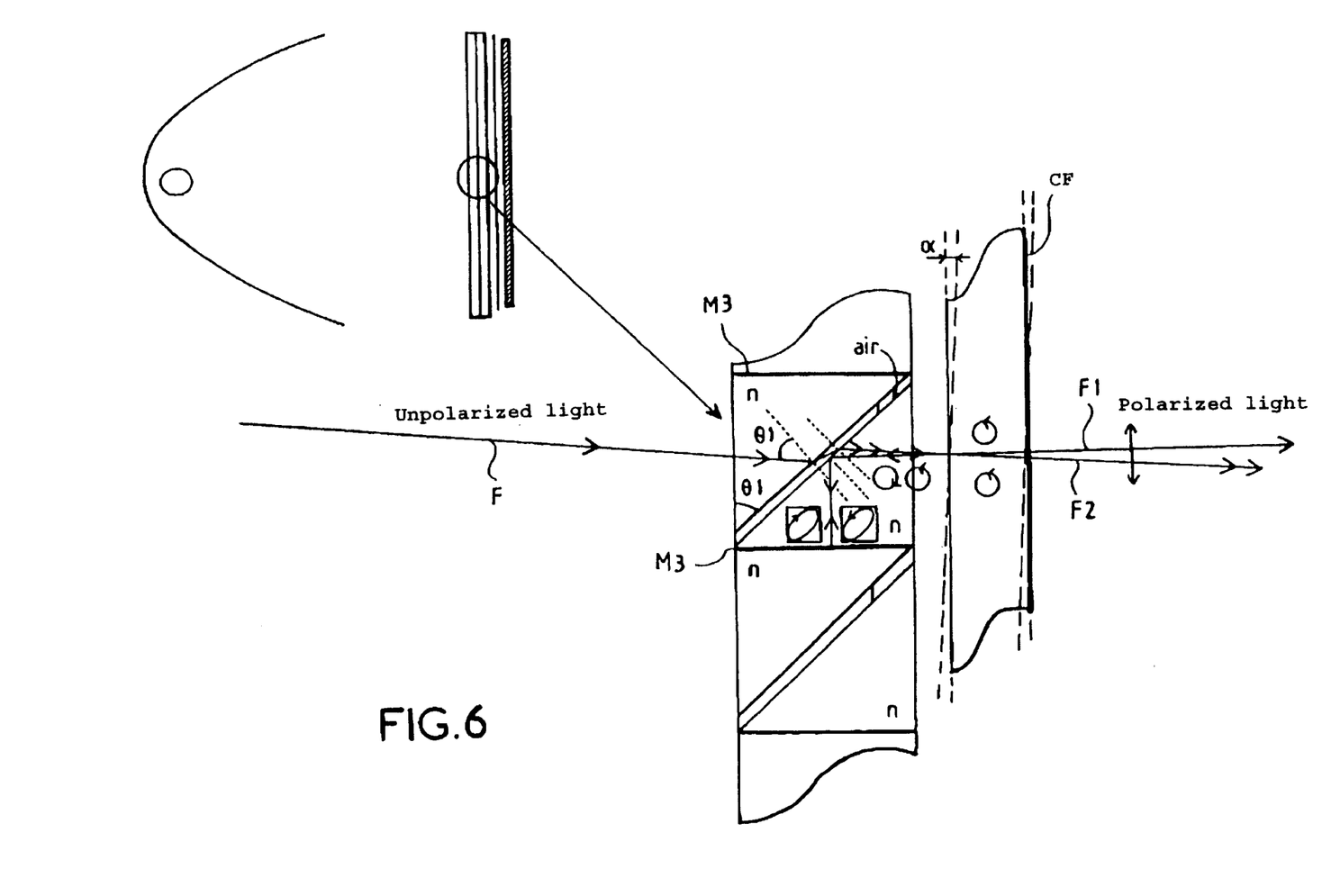
FIG. 6, an illumination system applying polarization devices, like that in FIG. 5e, as miniaturized multi-elements.

This system may be applied to the projection system via two "large" prisms. However, it is possible to design quite a thin polarizing converter by forming a set of several small polarizing conversion systems, as shown in FIG. 6. In this way, we obtain the polarizing converter with a smaller thickness. The operating principle is identical to that already mentioned hereinabove, especially with regard to FIG. 5d (in this case the filter CF is inclined at an angle α with respect to the exit faces of the prisms) or with regard to FIG. 5e. The circularly polarized light (for example right-circularly polarized) is reflected.

The total internal reflection introduces a phase shift of δ between the s and p components.

Reflection on the mirror M3 introduces a phase shift of π.

Total internal reflection again introduces a phase shift, of −δ, between the s and p components.

Thus, the total phase shift is π. The right-circularly polarized light becomes left-circularly polarized light.

This miniaturized system has several advantages:
- if the miniaturized polarizing converter is fitted to the liquid-crystal display (with polarizer and analyzer), we avoid any losses and improve the light efficiency by a factor of 2;
- the prism system may be thin and easy to manufacture. It may be composed of a moulded transparent material (glass or acrylic).

Figure 7:
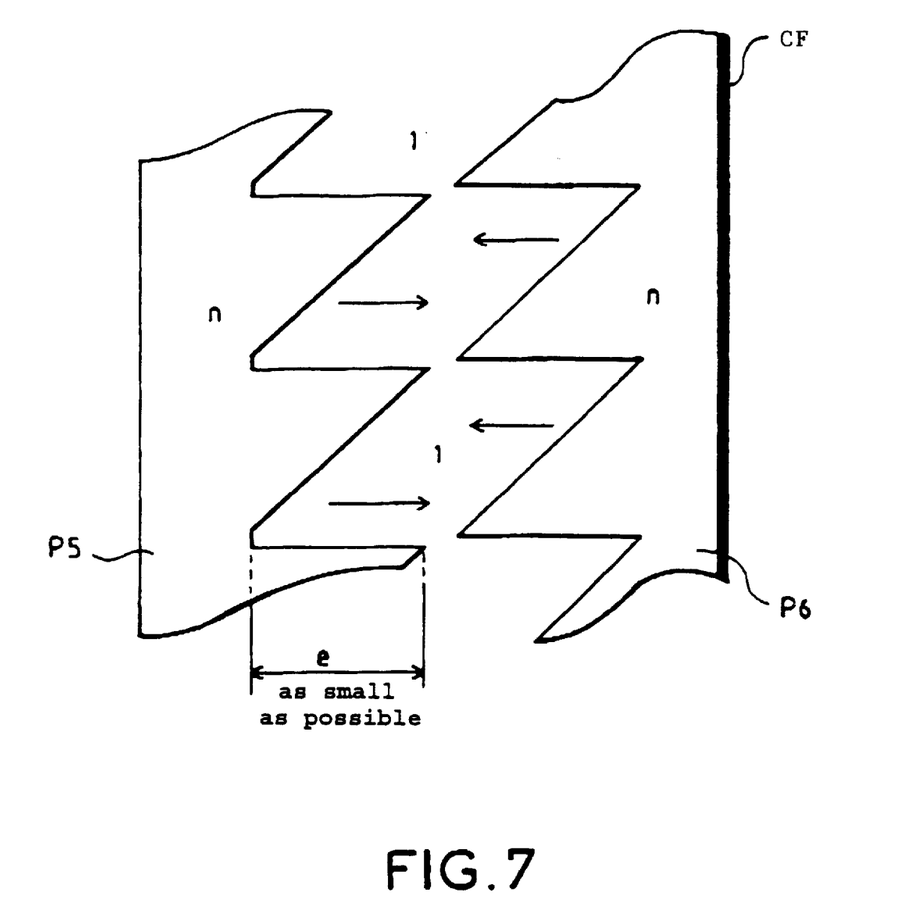
FIG. 7, an embodiment of the system in FIG. 6.

To do this, two dentate plates P5, P6 (made of glass) are used, these having complementary shapes so as to form the prisms in FIG. 7. Each tooth has, for example, a first face perpendicular to the plane of the plates and a second face inclined substantially at 45°. The first face is metallized to form the mirror M3.

The cholesteric filter CF may be on the plane face of the plate P6.

Next, the two plates P5, P6 are fitted one inside the other.

The prism system may be configured along two possible directions—one along the long side of the LCD display and the other along the short side. In the case of current AM-type LCD displays, in which the contrast is superior for the angle of illumination along the longer side of the LCD display, it is clear that the system must be installed along the direction of the short side of the liquid-crystal screen.

Figure 8A:
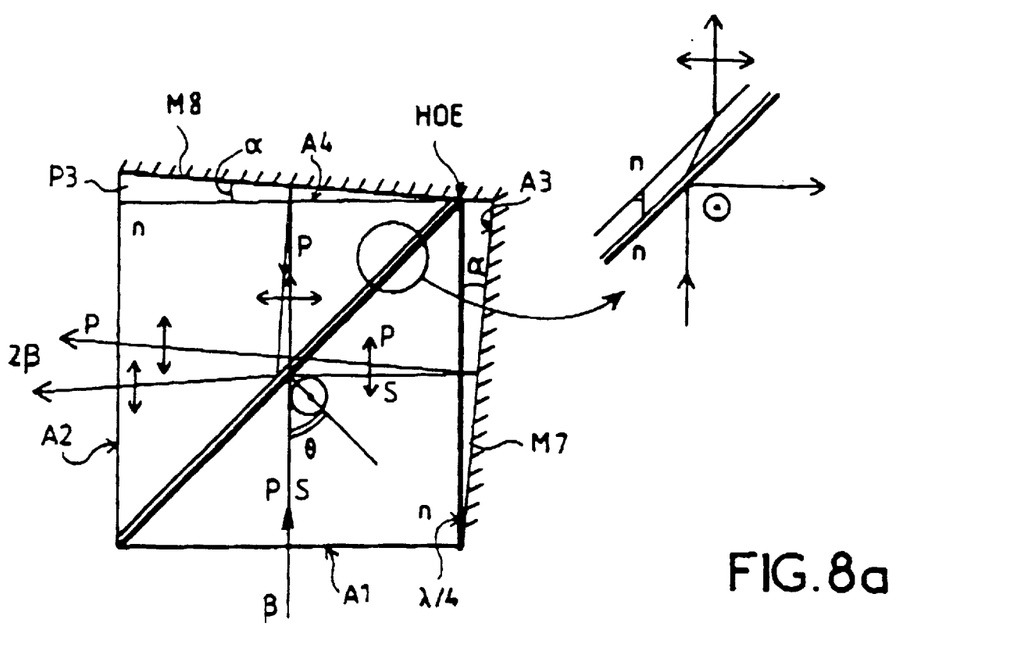
FIGS. 8a and 8b, an illumination system which includes a holographic polarizing splitter device.

FIG. 8a shows an alternative form in which the cholesteric filter is placed between the two common faces of the two prisms. In this alternative form, the cholesteric filter may be replaced by an alternative system using a holographic element HOE. The holographic optical element, consisting of a phase-volume diffracting element, may provide an effective optical function when it is produced in quite a thin film (a thickness of approximately 10 μm). These components are less expensive, lightweight and may be combined with another optical function.

The polarizing splitting function is achieved by recording the interference patterns resulting from the interference of two coherent plane waves in a thin-film photosensitive material. The index variation (dn) induced in the material is large. The variations in the recording index enable a mirror function to be produced for one polarization component (45° Brewster conditions), the second polarization component being totally transmitted.

Figure 8B:
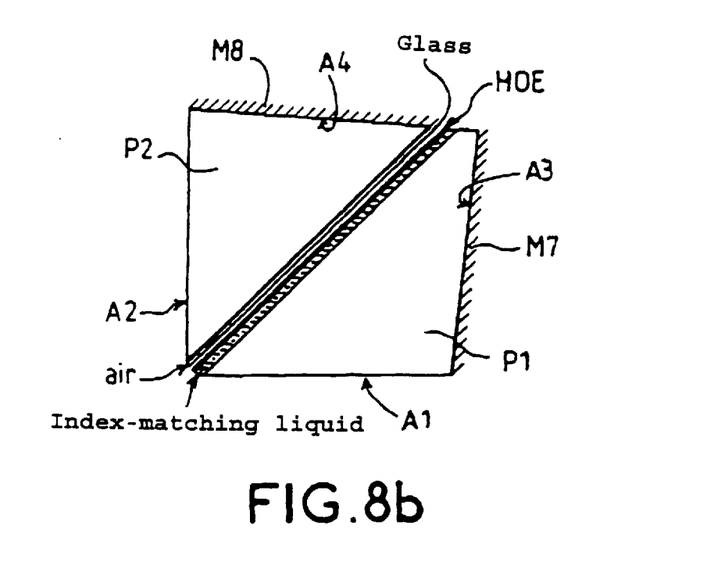

FIG. 8b shows an embodiment of the device in FIG. 8a. The holographic splitter HOE is produced on a glass plate and adhesively bonded to the hypotenuse face of the prism P1 by the use of an index-matching substance. The prisms P1 and P2 are each produced from a single piece, with their faces M7, M8 metallized.

This type of component is commonly employed for various colours (that is to say a limited bandwidth).

This polarizing conversion system of the invention is therefore based on a very compact holographic optical polarizer. The latter may be used in a projection system for white light or for each colour.

Unpolarized (white or monochrome) light is incident on the polarizer HOE. The light polarized in a direction "S" is totally reflected. The perpendicularly polarized light "p" is not diffracted and passes through the polarizer HOE (fitted to the hypotenuse of the prism). Because of the angle of incidence, θ is less than the critical angle [$\theta_c$=arcsin (1/n)]. Next, the "p" component is transmitted twice at the HOE/air and air/glass boundaries. This "p" component is reflected by the inclined mirror M8 and then by the phenomenon of total internal reflection (TIR). The "s" component reflected by the polarizer HOE passes twice through a λ/4 plate and is reflected on the inclined mirror M7. Next, the "s"-type polarized beam becomes a "p"-type polarized beam. This beam again becomes incident on the polarizer HOE and is then totally transmitted—first of all by the HOE and then by the HOE/air and air/glass boundaries.

In this way, the light is totally polarized. This method has several advantages, namely:

the two optical paths are equal, and so there is no problem of uniformity when illuminating the LCD display;

by virtue of the holographic polarizing beam splitter currently used for each colour, it is possible to design a polarizing converter for each channel of a three-LCD system without excessively increasing the overall size of the projection system;

the p polarization passing through the glass/air and air/glass dioptric interfaces is virtually unattenuated, which reduces the Fresnel losses of the system to a minimum.

The liquid-crystal screen therefore receives two main beams F1, F2 which are polarized in the same way, each being focused by the microlenses onto half of the pixels (onto each row, for example). Within each pixel, the focusing depends only on the illumination aperture of the lamp. The following is therefore in no way different, if the polarization system is disregarded.

However, the optimum focusing conditions are as follows:

for each pixel, the focusing is slightly offset with respect to the axis;

to have an optimized system, it is therefore necessary to satisfy the condition below:

arctan (p/f)≧$\beta_{glass}$ where p is the horizontal pitch of the liquid-crystal display (see FIG. 6a) and f is the focal length of each microlens in the thickness of the glass or of the liquid-crystal display.

If this condition is not met (for example if the pitch is too small or too large), it is possible to modify the thickness of the display.

If the illumination aperture β is too great, the recombiner will be able to act as an angle filter. This is because, if the polarizing converter is designed to obtain ± β deg. in air, for example, and the value of the extent of the lamp varies (throughout its lifetime or after it has been changed), all the beams of angles greater than β will be transmitted for one arm only (no total internal reflection), and then reflected for the second arm and not transmitted in their entirety. In this way, the illumination box is an angle filter. We are thus able to use a more extended light source without affecting the contrast of the liquid-crystal display.

The efficiency of such a polarizing converter, compared with a conventional system, is as follows:

Gain=[R+T]/$T_{polarizer}$ for a polarizing splitter (a conventional multilayer PBS) having a reflection coefficient R=0.99 and a transmission coefficient T=0.95, we have (FIG. 5a):

R=0.5×0.99×1×0.86×0.98=0.416

T=0.5×0.95×1×0.94×1×0.98=0.437

Gain=[0.416+0.437]/0.41≈2.1 without polarizer

Gain=[0.416+0.437]×[0.82/0.41]≈1.7 with polarizer;

for a cholesteric filter having R=0.96 and T=0.96 we have:

R=[0.86/2]×0.96×0.98×0.98×0.9=0.356

T=[0.86/2]×0.96×0.98×0.98=0.404

Gain=[0.356+0.440]×[(0.82×0.93)/0.41]≈1.32 with polarizer.

The two calculations were performed on the basis of the following parameters:

antiglare coating coefficient of 0.98 both for the prisms and for the double prism;

total reflection coefficient, R=1;

transmission coefficient of the double prism, 0.86;

transmission coefficient of the polarizer, 0.41;

transmission coefficient of the analyzer, 0.82;

reflection coefficient of the mirror M3=0.9;

polarizability of the cholesteric filter=0.93; and the transmission coefficient of the λ polarization-rotation plate is taken to be equal to 94%.

The system of the invention has several advantages, namely:

the system is optimal for the polarization and focusing converter;

the focusing along the horizontal axis does not alter the contrast values since the horizontally allowable angle of the liquid-crystal display is quite wide;

the p polarization passing through the glass/air and air/glass dioptric interfaces is hardly attenuated since it is "p". This limits the Fresnel losses of the system to a minimum.

Figure 10:
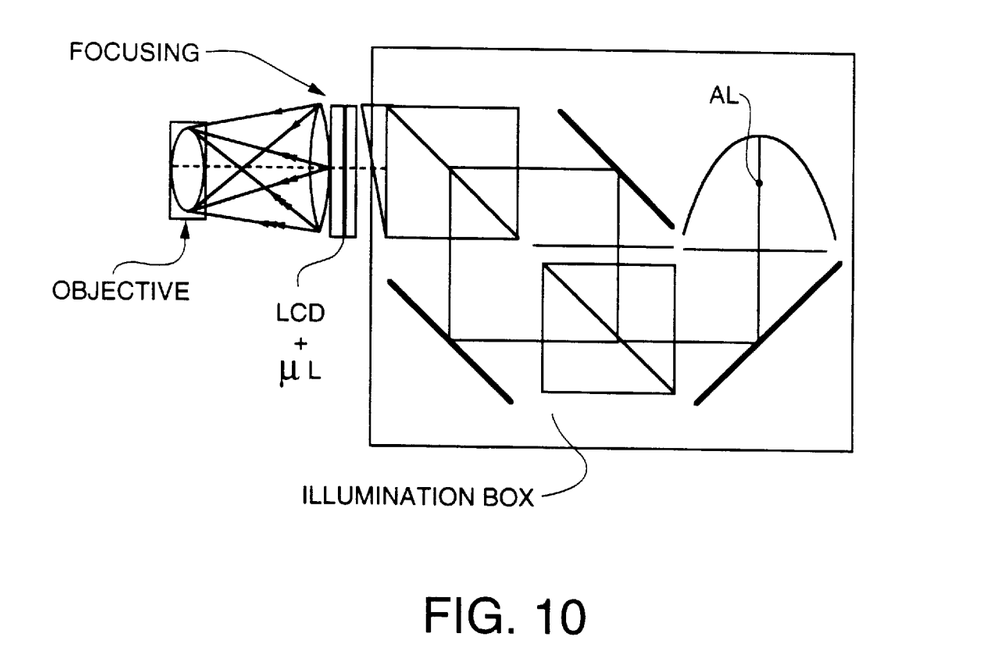
FIG. 10, a general arrangement of the system of the invention.

At the exit of this system, we may use this beam directly to illuminate the liquid-crystal display of a monovalve or monochrome projector (see FIG. 10) or for a three-valve system for trichrome projection. In this system, there is an illumination box supplying two beams as described above, the LCD screen and the array of microlenses μL.

I claim:

1. System for illuminating a liquid-crystal screen, comprising a light source emitting an unpolarized light beam (F), a polarizing splitter device (PBS) receiving this unpolarized light beam and retransmitting, onto the liquid-crystal screen, a first and a second beam (F1, F2) which are complimentary polarized, emitted in the same direction, the axes of the two beams making a defined angle (dβ), characterized in that it includes a matrix of microlenses with one microlens (μL) for at least two adjacent picture elements (EL1, EL2) in the liquid-crystal screen, each microlens directing that part of the first beam which it receives onto one (EL1) of the two picture elements and that part of the second beam which it receives onto the other picture element (EL2).

2. System according to claim 1, characterized in that the screen (LCD) is in the focal plane of the microlenses (μL).

3. System according to claim 1, characterized in that the microlenses (μL) are spherical.

4. System according to claim 1, characterized in that the microlenses (μL) are cylindrical and each enables two rows of picture elements to be illuminated.

5. System according to claim 1, characterized in that the polarizing splitter device (PBS) includes a polarizing splitter which spatially splits the light from the source into two beams (F1, F2) which are polarized differently, at least one reflector (M1, M2) associated with a path of one beam (F1, F2), a beam recombiner (DPC) receiving the two beams and transmitting them to the screen (LCD).

6. System according to claim 5, characterized in that it includes two reflectors (M1, M2) each associated with the path of a beam (F1, F2).

7. System according to either of claims 5 and 6, characterized in that the reflectors (M1, M2) are rotatable.

8. System according to claim 5, characterized in that it includes a polarization-rotation (λ/2) device arranged in the path of one of the beams (F1 or F2).

9. System according to claim 1, characterized in that it includes:

a device for splitting the first beam into a third and fourth beam, and the second beam into a fifth and sixth beam; and an integrator device (OI) for superimposing the four beams obtained on the matrix of microlenses (μL), each microlens (μL1) enabling the four beams to be transmitted separately to four pixels (EL1, EL2, EL3, EL4).

10. System according to claim 1, characterized in that the polarizing splitter includes a double prism having an entry face (A1) receiving the unpolarized light beam (F), a reflection face (A3), an exit face (A2) receiving the unpolarized light beam (F) transmitted via the double prism, a polarizing filter (CF), being associated with the exit face (A2), transmitting the light of a polarization type (F1) and reflecting the light of another polarization type onto the reflection face (A3) which reflects the light onto the exit face (A2) after polarization rotation.

11. System according to claim 10, characterized in that the polarizing filter (CF) makes an angle other than 90° with the direction of the unpolarized light beam.

12. System according to claim 10, characterized in that the double prism has an internal reflection face inclined substantially at 45° with respect to the entry and exit faces, the unpolarized light beam (F) having an angle of incidence (θ) on this face other than 45°.

13. System according to claim 10, characterized in that the reflection face includes a retroreflective mirror (RM).

14. System according to claim 10, characterized in that the reflection face includes a λ/4 polarization-rotation device.

15. System according to claim 10, characterized in that the entry face and the exit face are two opposite faces of the double prism and in that one of the prisms carries the polarizing filter (CF) on one of two of these adjacent faces and a reflective surface (M3) on the other.

16. System according to claim 15, characterized in that it includes a series of juxtaposed double prisms, the entry faces of the various double prisms lying in the same first plane and the exit faces of the various double prisms lying in the same second plane.

17. System according to claim 16, characterized in that it includes two dentate transparent plates (P5, P6) fitted one into the other by their teeth, each tooth having a face perpendicular to the plane of the plate and an inclined face, the perpendicular faces of one of the plates at least being reflective.

18. System according to claim 17, characterized in that a plane face of one plate (P6) opposite the dentate face is provided with a polarizing filter.

19. System according to claim 1, characterized in that the polarizing splitter (PBS) includes a double prism having a first entry face receiving the unpolarized light beam (F), a second face opposite this entry face and having reflection means (M8), a third face, adjacent to the first and second faces, possessing reflection means (M7) and in that, between the two half-prisms, a layer of photosensitive material is provided in which a hologram is recorded, enabling a light polarized in a first direction to be reflected and enabling a light polarized in a second direction, perpendicular to the first direction, to be transmitted.

* * * * *